United States Patent [19]
Ng et al.

[11] Patent Number: 6,124,409
[45] Date of Patent: Sep. 26, 2000

[54] PROCESSES FOR PREPARING COPOLYMERS

[75] Inventors: T. Hwee Ng, Mississauga; Hadi K. Mahabadi, Toronto; Man C. Tam; Gregory J. Kovacs, both of Mississauga; Eric M. Peters, Waterloo; Rafik O. Loutfy, Willowdale, all of Canada

[73] Assignee: Xerox Corporation, Stamford, Conn.

[21] Appl. No.: 07/929,457

[22] Filed: Aug. 12, 1992

Related U.S. Application Data

[63] Continuation of application No. 07/724,078, Jul. 1, 1991, abandoned.

[51] Int. Cl.$^7$ .............................. C08F 4/38; C08F 2/18
[52] U.S. Cl. ...................... 526/73; 526/228; 526/921
[58] Field of Search ................... 526/61, 73, 228, 526/921

[56] References Cited

U.S. PATENT DOCUMENTS

| | | | |
|---|---|---|---|
| 2,666,046 | 1/1954 | Nelson et al. | 260/88.1 |
| 2,757,166 | 7/1956 | Segro et al. | 260/85.5 |
| 2,846,424 | 8/1958 | Mino | 260/85.5 |
| 3,222,429 | 12/1965 | Boyd et al. | 260/880 |
| 3,498,938 | 3/1970 | Grommers et al. | 260/17 |
| 4,125,696 | 11/1978 | Kamath | 526/73 |
| 4,129,703 | 12/1978 | Kamath et al. | 526/73 |
| 4,129,704 | 12/1978 | Sanchez | 526/73 |
| 4,130,700 | 12/1978 | Kamath | 526/73 |
| 4,141,806 | 2/1979 | Keggenhoff et al. | 204/159.22 |
| 4,853,307 | 8/1989 | Tam et al. | 430/41 |
| 4,880,715 | 11/1989 | Tam et al. | 430/41 |
| 4,883,731 | 11/1989 | Tam et al. | 430/41 |
| 4,970,130 | 11/1990 | Tam et al. | 430/41 |

OTHER PUBLICATIONS

Reactivity, Mechanism and Structure in Polymer Chemistry, ed. A. D. Jenkins and A. Ledwith, John Wiley, New York, 1974, pp. 158–174.

*Primary Examiner*—John Goodrow
*Attorney, Agent, or Firm*—Judith L. Byorick

[57] ABSTRACT

Disclosed is a process for preparing copolymers which comprises, in the order stated: (1) adding monomers containing unsaturated carbon-to-carbon bonds, a first polymerization initiator, a second polymerization initiator, and a solvent to a reaction vessel; (2) purging the resulting solution with an inert gas; (3) sealing the reaction vessel and pressurizing it by addition of an inert gas to a pressure of from about 20 to about 600 kilopascals over ambient atmospheric pressure; (4) maintaining the temperature within the pressurized reaction vessel at a temperature of from about 50 to about 100° C. for a period of from about 60 to about 300 minutes; (5) thereafter maintaining the temperature within the pressurized reaction vessel at a temperature of from about 80 to about 115° C. for a period of from about 30 to about 300 minutes, wherein the temperature in step (5) is higher than the temperature in step (4); and (6) subsequently maintaining the temperature within the pressurized reaction vessel at a temperature of from about 115 to about 160° C. for a period of from about 30 to about 180 minutes, wherein the temperature in step (6) is higher than the temperature in step (5). Polymers prepared according to the process of the present invention can be particularly useful in migration imaging members.

22 Claims, 1 Drawing Sheet

FIG. 1

PROCESSES FOR PREPARING COPOLYMERS

This is a continuation of application Ser. No. 07/724,078, filed Jul. 1, 1991 now abandoned.

BACKGROUND OF THE INVENTION

The present invention is directed to a process for preparing copolymers. More specifically, the present invention is directed to a process for preparing copolymers of monomers having unsaturated carbon-to-carbon bonds. One embodiment of the present invention is directed to a process for preparing copolymers which comprises, in the order stated: (1) adding monomers containing unsaturated carbon-to-carbon bonds, a first polymerization initiator, a second polymerization initiator, and a solvent to a reaction vessel; (2) purging the resulting solution with an inert gas; (3) sealing the reaction vessel and pressurizing it by addition of an inert gas to a pressure of from about 20 to about 600 kilopascals above ambient atmospheric pressure; (4) maintaining the temperature within the pressurized reaction vessel at a temperature of from about 50 to about 100° C. for a period of from about 60 to about 300 minutes; (5) thereafter maintaining the temperature within the pressurized reaction vessel at a temperature of from about 80 to about 115° C. for a period of from about 30 to about 300 minutes, wherein the temperature in step 5 is higher than the temperature in step 4; and (6) subsequently maintaining the temperature within the pressurized reaction vessel at a temperature of from about 115 to about 160° C. for a period of from about 30 to about 180 minutes, wherein the temperature in step 6 is higher than the temperature in step 5. Polymers prepared according to the process of the present invention can be particularly useful as softenable materials in migration imaging members.

Processes for preparing copolymers are known. For example, U.S. Pat. No. 2,757,166 (Segro et al.) discloses a process for the bulk polymerization of acrylonitrile or copolymerization of acrylonitrile with at least one other compound containing a polymerizable $CH_2=C<$ grouping. The process enables the polymerization or copolymerization of acrylonitrile to substantial completion in the presence of a catalyst such as tertiary butyl permaleic acid or tertiary butyl perphthalic acid. Typical reaction conditions include temperatures of from 85 to 130° C. and pressure of about 1 atmosphere.

In addition, U.S. Pat. No. 4,141,806 (Keggenhoff et al.) discloses a bulk photopolymerization process for esters of acrylic and methacrylic acids. The ethylenically unsaturated monomers are polymerized in bulk in the presence of from 0 to 10 percent by weight of a photoinitiator by irradiation of UV light in a first reaction stage at or below the boiling point of the reaction mixture, up to a conversion of 40 to 80 percent by weight, followed by a second reaction stage at a temperature which has been raised by from 20 to 120° C. and is above the glass transition temperature of the resulting polymer, up to a conversion of above 90 percent by weight, the percentages in each case relating to the total amount of monomer.

Of further background interest with respect to polymerization processes are U.S. Pat. Nos. 2,666,046, 2,846,424, 3,222,429, and 3,498,938.

Migration imaging members are well known, and are described in detail in, for example, U.S. Pat. No. 3,975,195 (Goffe), U.S. Pat. No. 3,909,262 (Goffe et al.), U.S. Pat. No. 4,536,457 (Tam), U.S. Pat. No. 4,536,458 (Ng), U.S. Pat. No. 4,013,462 (Goffe et al.), and "Migration Imaging Mechanisms, Exploitation, and Future Prospects of Unique Photographic Technologies, XDM and AMEN", P. S. Vincett, G. J. Kovacs, M. C. Tam, A. L. Pundsack, and P. H. Soden, *Journal of Imaging Science* 30 (4) July/August, pp. 183–191 (1986), the disclosures of each of which are totally incorporated herein by reference. Migration imaging members containing charge transport materials in the softenable layer are also known, and are disclosed, for example, in U.S. Pat. No. 4,536,457 (Tam) and U.S. Pat. No. 4,536,458 (Ng), the disclosures of each of which are totally incorporated herein by reference. A typical migration imaging member comprises a substrate, a layer of softenable material, and photosensitive marking material in the form of a fracturable layer contiguous with the upper surface of the softenable layer. The member is imaged by first electrically charging the member and exposing the charged member to a pattern of activating electromagnetic radiation such as light to form a latent image on the member. Subsequently, the imaged member is developed by one of several methods, such as application of heat, solvent, solvent vapor, or the like, causing the marking material in the exposed areas of the member to migrate in depth through the softenable material toward the substrate.

The expression "softenable" as used herein is intended to mean any material which can be rendered more permeable, thereby enabling particles to migrate through its bulk. Conventionally, changing the permeability of such material or reducing its resistance to migration of migration marking material is accomplished by dissolving, swelling, melting, or softening, by techniques, for example, such as contacting with heat, vapors, partial solvents, solvent vapors, solvents, and combinations thereof, or by otherwise reducing the viscosity of the softenable material by any suitable means.

The expression "fracturable" layer or material as used herein means any layer or material which is capable of breaking up during development, thereby permitting portions of the layer to migrate toward the substrate or to be otherwise removed. The fracturable layer is preferably particulate in the various embodiments of the migration imaging members. Such fracturable layers of marking material are typically contiguous to the surface of the softenable layer spaced apart from the substrate, and such fracturable layers can be substantially or wholly embedded in the softenable layer in various embodiments of the imaging members.

The expression "contiguous" as used herein is intended to mean in actual contact, touching, also, near, though not in contact, and adjoining, and is intended to describe generically the relationship of the fracturable layer of marking material in the softenable layer with the surface of the softenable layer spaced apart from the substrate.

The expression "optically sign-retained" as used herein is intended to mean that the dark (higher optical density) and light (lower optical density) areas of the visible image formed on the migration imaging member correspond to the dark and light areas of the illuminating electromagnetic radiation pattern.

The expression "optically sign-reversed" as used herein is intended to mean that the dark areas of the image formed on the migration imaging member correspond to the light areas of the illuminating electromagnetic radiation pattern and the light areas of the image formed on the migration imaging member correspond to the dark areas of the illuminating electromagnetic radiation pattern.

The expression "optical contrast density" as used herein is intended to mean the difference between maximum optical density ($D_{max}$) and minimum optical density ($D_{min}$) of an image. Optical density is measured for the purpose of this invention by diffuse densitometers with a blue Wratten No. 94 filter. The expression "optical density" as used herein is intended to mean "transmission optical density" and is represented by the formula:

$$D = \log_{10}[l_o/l]$$

where l is the transmitted light intensity and $l_o$ is the incident light intensity. For the purpose of this invention, all values of transmission optical density given in this invention include the substrate density of about 0.2 which is the typical density of a metallized polyester substrate used in this invention.

Various means for developing the latent images can be used for migration imaging systems. These development methods include solvent wash away, solvent vapor softening, heat softening, and combinations of these methods, as well as any other method which changes the resistance of the softenable material to the migration of particulate marking material through the softenable layer to allow imagewise migration of the particles in depth toward the substrate. In the solvent wash away or meniscus development method, the migration marking material in the light struck region migrates toward the substrate through the softenable layer, which is softened and dissolved, and repacks into a more or less monolayer configuration. In migration imaging films supported by transparent substrates alone, this region exhibits a maximum optical density which can be as high as the initial optical density of the unprocessed film. On the other hand, the migration marking material in the unexposed region is substantially washed away and this region exhibits a minimum optical density which is essentially the optical density of the substrate alone. Therefore, the image sense of the developed image is optically sign reversed. Various methods and materials and combinations thereof have previously been used to fix such unfixed migration images. In the heat or vapor softening developing modes, the migration marking material in the light struck region disperses in the depth of the softenable layer after development and this region exhibits $D_{min}$ which is typically in the range of 0.6 to 0.7. This relatively high $D_{min}$ is a direct consequence of the depthwise dispersion of the otherwise unchanged migration marking material. On the other hand, the migration marking material in the unexposed region does not migrate and substantially remains in the original configuration, i.e. a monolayer. In migration imaging films supported by transparent substrates, this region exhibits a maximum optical density ($D_{max}$) of about 1.8 to 1.9. Therefore, the image sense of the heat or vapor developed images is optically sign-retained.

The background portions of an imaged member can sometimes be transparentized by means of an agglomeration and coalescence effect. In this system, an imaging member comprising a softenable layer containing a fracturable layer of electrically photosensitive migration marking material is imaged in one process mode by electrostatically charging the member, exposing the member to an imagewise pattern of activating electromagnetic radiation, and softening the softenable layer by exposure for a few seconds to a solvent vapor thereby causing a selective migration in depth of the migration material in the softenable layer in the areas which were previously exposed to the activating radiation. The vapor developed image is then subjected to a heating step. Since the exposed particles gain a substantial net charge (typically 85 to 90 percent of the deposited surface charge) as a result of light exposure, they migrate substantially in depth in the softenable layer towards the substrate when exposed to a solvent vapor, thus causing a drastic reduction in optical density. The optical density in this region is typically in the region of 0.7 to 0.9 (including the substrate density of about 0.2) after vapor exposure, compared with an initial value of 1.8 to 1.9 (including the substrate density of about 0.2). In the unexposed region, the surface charge becomes discharged due to vapor exposure. The subsequent heating step causes the unmigrated, uncharged migration material in unexposed areas to agglomerate or flocculate, often accompanied by coalescence of the marking material particles, thereby resulting in a migration image of very low minimum optical density (in the unexposed areas) in the 0.25 to 0.35 range. Thus, the contrast density of the final image is typically in the range of 0.35 to 0.65. Alternatively, the migration image can be formed by heat followed by exposure to solvent vapors and a second heating step which also results in a migration image with very low minimum optical density. In this imaging system as well as in the previously described heat or vapor development techniques, the softenable layer remains substantially intact after development, with the image being self-fixed because the marking material particles are trapped within the softenable layer.

The word "agglomeration" as used herein is defined as the coming together and adhering of previously substantially separate particles, without the loss of identity of the particles.

The word "coalescence" as used herein is defined as the fusing together of such particles into larger units, usually accompanied by a change of shape of the coalesced particles towards a shape of lower energy, such as a sphere.

Xeroprinting processes employing migration imaging members are also known. For example, U.S. Pat. No. 4,970,130 (Tam et al.), the disclosure of which is totally incorporated herein by reference, discloses a xeroprinting process which comprises (1) providing a xeroprinting master comprising (a) a substrate; and (b) a softenable layer comprising a softenable material, a charge transport material capable of transporting charges of one polarity, and migration marking material situated contiguous to the surface of the softenable layer spaced from the substrate, wherein a portion of the migration marking material has migrated through the softenable layer toward the substrate in imagewise fashion; (2) uniformly charging the xeroprinting master to a polarity opposite to the polarity of the charges that the charge transport material in the softenable layer is capable of transporting; (3) uniformly exposing the charged master to activating radiation, thereby discharging those areas of the master wherein the migration marking material has migrated toward the substrate and forming an electrostatic latent image; (4) developing the electrostatic latent image; and (5) transferring the developed image to a receiver sheet.

In addition, U.S. Pat. No. 4,883,731 (Tam et al.), the disclosure of which is totally incorporated by reference, discloses a xeroprinting process wherein the xeroprinting master is a developed migration imaging member wherein a charge transport material is present in the softenable layer. According to the teachings of this patent, the xeroprinting process entails uniformly charging the master to a polarity the same as the polarity of charges which the charge transport material is capable of transporting, followed by flood exposure of the master to form a latent image, development of the latent image with a toner, and transfer of the developed image to a receiving member. The contrast voltage of the electrostatic latent image obtainable from this process generally initially increases with increasing flood exposure light intensity, typically reaches a maximum value of about 45 to 50 percent of the initially applied voltage and then decreases with further increase in flood exposure light intensity. The light intensity for the flood exposure step thus generally must be well controlled to maximize the contrast potential.

U.S. Pat. No. 4,880,715 (Tam et al.), the disclosure of which is totally incorporated by reference, discloses a xeroprinting process wherein the xeroprinting master is a developed migration imaging member wherein a charge transport material is present in the softenable layer and non-exposed marking material in the softenable layer is caused to agglomerate and coalesce. According to the teachings of this patent, the xeroprinting process entails uniformly charging the master to a polarity the same as the polarity of charges which the charge transport material is capable of transporting, followed by flood exposure of the master to form a latent image, development of the latent image with a toner, and transfer of the developed image to a receiving member. The contrast voltage of the electrostatic latent image obtainable from this process generally initially increases with increasing flood exposure light intensity, typically reaches a maximum value of about 60 percent of the initially applied voltage and then decreases with further increase in flood exposure light intensity. The light intensity for the flood exposure step thus generally must be well controlled to maximize the contrast potential.

U.S. Pat. No. 4,853,307 (Tam et al.), the disclosure of which is totally incorporated herein by reference, discloses a migration imaging member containing a copolymer of styrene and ethyl acrylate in at least one layer adjacent to the substrate. When developed, the imaging member can be used as a xeroprinting master. According to the teachings of this patent, the xeroprinting process entails uniformly charging the master to a polarity the same as the polarity of charges which the charge transport material is capable of transporting, followed by flood exposure of the master to form a latent image, development of the latent image with a toner, and transfer of the developed image to a receiving member.

Preferred materials for the softenable layer of migration imaging members include copolymers of vinyl monomers, such as styrene-acrylic copolymers, including styrene-hexylmethacrylate or styrene-ethyl acrylate-acrylic acid copolymers, polystyrenes, including polyalphamethyl styrene, alkyd substituted polystyrenes, styrene-olefin copolymers, styrene-vinyltoluene copolymers, vinyl toluene butadiene copolymers, styrene butadiene copolymers, vinyl toluene acrylate copolymers, vinyl toluene α-methyl styrene copolymers, vinyl acetate polymers, saturated polyesters, unsaturated polyesters, mixtures thereof, copolymers thereof, and the like. While many of these materials are commercially available, not all commercially available vinyl copolymers exhibit characteristics that are preferred or desirable in softenable materials intended for use in migration imaging members. For example, one commercially available copolymer of styrene, ethyl acrylate, and acrylic acid containing about 74 mole percent styrene, about 25 mole percent ethyl acrylate, and about 1 mole percent acrylic acid, with a $M_n$ of about 30,000, a $M_w$ of about 72,000, an acid number of about 8, a $T_g$ of about 65° C., and a melt viscosity of about $4 \times 10^5$ poise at 110° C. may exhibit undesirable characteristics, such as high melt viscosity as a result of the high styrene content; during heat development of an image on a migration imaging member with a softenable layer of a material with a melt viscosity of this magnitude, the softenable layer may not allow sufficient migration of the photosensitive marking material to form an image of acceptable optical contrast density. Further, if the imaged member is then used as a xeroprinting master, the lack of acceptable contrast density can result in insufficient electrostatic contrast voltage for xeroprinting. An imaging member containing a softenable layer of a high melt viscosity material may also exhibit other undesirable characteristics, such as reduced photosensitivity at the temperatures required to develop the member. Other commercially available copolymers of styrene, ethyl acrylate, and acrylic acid, such as one containing about 48 mole percent styrene, about 50 mole percent ethyl acrylate, and about 2 mole percent acrylic acid, with a $M_n$ of about 21,000, a $M_w$ of about 54,000, an acid number of about 15, a $T_g$ of about 36° C., and a melt viscosity of about $2 \times 10^4$ poise at 110° C. may exhibit undesirable characteristics, such as a low glass transition temperature (Tg) as a result of the low styrene content of the polymer; the low Tg can lead to a tendency of imaging members containing this material as a softenable layer to block under conditions of elevated temperatures and pressures. Blocking or sticking together results when the imaging member is stored in roll or sheet form under pressure and under relatively high storage conditions (such as about 35° C.), and can cause damage such as delamination of the layers of the imaging member when separation of the blocked roll or sheets is attempted.

Copolymers of vinyl monomers with highly desirable characteristics for use as softenable materials in migration imaging members are known. For example, U.S. Pat. No. 4,853,307, the disclosure of which is totally incorporated herein by reference, describes in Examples XVIII, XIX, and XX a process for preparing a terpolymer of styrene, ethyl acrylate, and acrylic acid. The process generally entails adding the monomers of styrene, ethyl acrylate, and acrylic acid to a reactor vessel containing a solvent, such as toluene. The monomers are allowed to equilibrate to the reactor's temperature, typically from about 70 to about 100° C., while the system is purged by bubbling nitrogen gas in the monomer solution. The monomer solution is stirred during purging and subsequent polymerization. The initiator is added to another portion of the solvent and is allowed to dissolve in or mix with the solvent before it is added to the reaction vessel. The polymerization is then allowed to proceed for 5 to 7 hours while the temperature in the reactor is controlled by cooling. The process described in U.S. Pat. No. 4,853,307, however, has some disadvantages in that at the end of the synthetic procedure, the residual levels of styrene and ethyl acrylate remaining in the terpolymer solution can be undesirably high (typically over 7 percent by weight styrene and over 7 percent by weight ethyl acrylate remain in the solution). The presence of these monomers in the solution at relatively high concentrations can have several drawbacks. For example, styrene and ethyl acrylate may pose potential health and safety hazards. In addition, ethyl acrylate has a very low odor threshold; the odor of ethyl acrylate vapor is readily detectable at 1 part per million airborne concentration, and the odor is relatively strong and moderately irritating at 4 parts per million airborne concentration. Thus, high concentrations of ethyl acrylate in terpolymer solutions of styrene, ethyl acrylate, and acrylic acid used to form softenable layers for migration imaging members may present potential safety problems and undesirable conditions in the preparation area. Further, the relatively high concentrations of residual monomers in the solution can increase the cost of producing the polymer, since the residual monomers result in "dead weight" in the polymer solution. Further, for polymers containing residual styrene monomers or residual ethyl acrylate monomers, it is extremely difficult to remove the residual monomers from a coated film of the polymer solution, since both monomers have high boiling points (for styrene, 145° C. and for ethyl acrylate, 99° C.). If the residual monomers are not removed from the film, their vapor emission inside a vacuum coating chamber while migration marking particles are being vacuum evaporated onto the softenable layer can adversely affect the imaging properties of the resulting imaging member; vapor release inside the vacuum chamber can cause the background pressure to rise to a level at which functional vacuum is lost. Residual monomers in the coated polymer film can also lower the glass transition temperature of the polymer and cause the softenable layer to block during the vacuum evaporation process to apply migration marking material to the softenable layer. When the conditions for preparing a softenable layer from a solution of a polymer containing high residual monomers are adjusted by increasing the temperature of the drying zone, however, the resulting softenable layer frequently exhibits an "orange peel" appearance on the surface, which can affect the resolution of the printed images because of the uneven surface.

Accordingly, while known materials and processes are suitable for their intended purposes, a need remains for improved processes for preparing copolymers of monomers having unsaturated carbon-to-carbon bonds. In addition, a need remains for processes for preparing copolymers of monomers having unsaturated carbon-to-carbon bonds with high yields. Further, there is a need for processes for preparing copolymers of monomers having unsaturated carbon-to-carbon bonds wherein the residual concentration subsequent to completion of the process of each monomer originally present in the reaction mixture is less than about 0.5 percent by weight. There is also a need for processes for preparing copolymers of monomers having unsaturated carbon-to-carbon bonds wherein the resulting copolymers enable preparation of high quality migration imaging members capable of generating high quality images. A need also exists for processes for preparing copolymers of monomers having unsaturated carbon-to-carbon bonds wherein the resulting copolymers enable preparation of high quality xeromasters capable of generating high quality images. In addition, there is a need for processes for preparing copolymers of monomers having unsaturated carbon-to-carbon bonds wherein the processes reduce the amounts of residual monomers present in the solution. Further, there is a need for processes for preparing copolymers of monomers having unsaturated carbon-to-carbon bonds wherein the processes reduce the amounts in the solution of residual monomers which may present potential health or safety problems. Additionally, there is a need for processes for preparing copolymers of monomers having unsaturated carbon-to-carbon bonds that are cost efficient. A need also remains for processes for preparing copolymers of monomers having unsaturated carbon-to-carbon bonds with improved reaction times. There is also a need for processes for preparing copolymers of monomers having unsaturated carbon-to-carbon bonds with yields of over 99 percent. In addition, there is a need for processes for preparing copolymers of monomers having unsaturated carbon-to-carbon bonds wherein the resulting copolymers are substantially free of gel formation, thereby preventing defects in migration imaging members employing the copolymer as a softenable material. Further, there is a need for processes for preparing copolymers of monomers having unsaturated carbon-to-carbon bonds wherein the resulting copolymers exhibit acceptable melt viscosity and improved mechanical strength. Additionally, there is a need for processes for preparing copolymers of monomers having unsaturated carbon-to-carbon bonds wherein the resulting copolymers exhibit a polydispersity ($M_w/M_n$) of about 2 or greater (preferably 3 or greater) and a molecular weight ($M_w$) of about 20,000 or greater.

SUMMARY OF THE INVENTION

It is an object of the present invention to provide improved processes for preparing copolymers of monomers having unsaturated carbon-to-carbon bonds.

It is another object of the present invention to provide processes for preparing copolymers of monomers having unsaturated carbon-to-carbon bonds with high yields.

It is yet another object of the present invention to provide processes for preparing copolymers of monomers having unsaturated carbon-to-carbon bonds wherein the residual concentration subsequent to completion of the process of each monomer originally present in the reaction mixture is less than about 0.5 percent by weight.

It is still another object of the present invention to provide processes for preparing copolymers of monomers having unsaturated carbon-to-carbon bonds wherein the resulting copolymers enable preparation of high quality migration imaging members capable of generating high quality images.

Another object of the present invention is to provide processes for preparing copolymers of monomers having unsaturated carbon-to-carbon bonds wherein the resulting copolymers enable preparation of high quality xeromasters capable of generating high quality images.

Yet another object of the present invention is to provide processes for preparing copolymers of monomers having unsaturated carbon-to-carbon bonds wherein the processes reduce the amounts of residual monomers present in the solution.

Still another object of the present invention is to provide processes for preparing copolymers of monomers having unsaturated carbon-to-carbon bonds wherein the processes reduce the amounts in the solution of residual monomers which may present potential health or safety problems.

It is another object of the present invention to provide processes for preparing copolymers of monomers having unsaturated carbon-to-carbon bonds that are cost efficient.

It is yet another object of the present invention to provide processes for preparing copolymers of monomers having unsaturated carbon-to-carbon bonds with improved reaction times.

It is still another object of the present invention to provide processes for preparing copolymers of monomers having unsaturated carbon-to-carbon bonds with yields of over 99 percent.

Another object of the present invention is to provide processes for preparing copolymers of monomers having unsaturated carbon-to-carbon bonds wherein the resulting copolymers are substantially free of gel formation, thereby preventing defects in migration imaging members employing the copolymer as a softenable material.

Yet another object of the present invention is to provide processes for preparing copolymers of monomers having unsaturated carbon-to-carbon bonds wherein the resulting copolymers exhibit acceptable melt viscosity and improved mechanical strength.

Still another object of the present invention is to provide processes for preparing copolymers of monomers having unsaturated carbon-to-carbon bonds wherein the resulting copolymers exhibit a polydispersity ($M_w/M_n$) of about 2 or greater and a molecular weight ($M_w$) of about 20,000 or greater.

These and other objects of the present invention (or specific embodiments thereof) can be achieved by providing a process for preparing copolymers which comprises, in the order stated: (1) adding monomers containing unsaturated carbon-to-carbon bonds, a first polymerization initiator, a second polymerization initiator, and a solvent to a reaction vessel; (2) purging the resulting solution with an inert gas; (3) sealing the reaction vessel and pressurizing it by addition of an inert gas to a pressure of from about 20 to about 600 kilopascals above ambient atmospheric pressure; (4) maintaining the temperature within the pressurized reaction vessel at a temperature of from about 50 to about 100° C. for a period of from about 60 to about 300 minutes; (5) thereafter maintaining the temperature within the pressurized reaction vessel at a temperature of from about 80 to about 115° C. for a period of from about 30 to about 300 minutes, wherein the temperature in step (5) is higher than the temperature in step (4); and (6) subsequently maintaining the temperature within the pressurized reaction vessel at a temperature of from about 115 to about 160° C. for a period of from about 30 to about 180 minutes, wherein the temperature in step (6) is higher than the temperature in step (5).

The monomers employed in the polymerization process of the present invention can be any monomer having a carbon to carbon unsaturated double bond. Examples include styrene, styrene derivatives such as alkyd substituted styrenes, polyalphamethyl styrene, dodecyl styrene, hexyl styrene, nonyl styrene, tetradecyl styrene, and the like; alkyl acrylates, typically wherein the alkyl portion has from 1 to about 14 carbon atoms, such as methyl acrylate, ethyl acrylate, propyl acrylate, butyl acrylate, pentyl acrylate, hexyl acrylate, benzyl acrylate, ethoxypropyl acrylate, isobutyl acrylate, and the like; alkyl alkylacrylates, typically wherein each alkyl portion has from 1 to about 14 carbon atoms, such as methyl methacrylate, methyl ethacrylate, methyl hexacrylate, ethyl methacrylate, ethyl ethacrylate, ethyl hexacrylate, butyl methacrylate, butyl ethacrylate, butyl hexacrylate, hexyl methacrylate, hexyl ethacrylate, hexyl hexacrylate, isobutyl methacrylate, ethoxypropyl methacrylate, lauryl methacrylate, stearyl methacrylate, and the like; vinyl toluene monomers; olefins, typically with from 2 to about 12 carbon atoms, such as ethylene, propylene, butylene, pentylene, and the like; diolefins, typically with from 4 to about 12 carbon atoms, such as butadiene, pentadiene, hexadiene, and the like; organic acids having carbon to carbon unsaturation and derivatives thereof, such as acrylic acid, methacrylic acid, ethacrylic acid, vinyl acetic acid, itaconic acid, allyl acetic acid, maleic acid, fumaric acid, crotonic acid, and the like, as well as mixtures thereof.

The process of the present invention can be used to prepare copolymers wherein the monomers are present in any desired relative amounts. For example, one class of typical copolymers that can be prepared by the process of the present invention contain one vinylidene aromatic compound in an amount of from about 30 to about 90 mole percent, and one ethylenically unsaturated acid ester in an amount of from about 10 to about 70 mole percent. Terpolymers can also be prepared, such as terpolymers containing one vinylidene aromatic compound in an amount of from about 30 to about 90 mole percent, one ethylenically unsaturated acid ester in an amount of from about 10 to about 70 mole percent, and organic acids having carbon to carbon unsaturation and derivatives thereof in an amount of from 0 to about 5 mole percent, preferably from about 0.2 to about 5 mole percent. One specific example of a copolymer that can be prepared by the process of the present invention is a terpolymer of styrene in an amount of from about 30 to about 90 mole percent, ethyl acrylate in an amount of from about 10 to about 70 mole percent, and acrylic acid in an amount of from 0 to about 5 mole percent, preferably from about 0.2 to about 5 mole percent. In a preferred embodiment of the present invention, a terpolymer is prepared comprising styrene in an amount of from about 40 to about 70 mole percent, ethyl acrylate in an amount of from about 29 to about 57 mole percent, and acrylic acid in an amount of from about 1 to about 3 mole percent.

The process of the present invention entails addition of two polymerization initiators to the reaction mixture. The first polymerization initiator is typically a free radical initiator, such as a peroxide or an azo polymerization initiator, whose 10 hour half-life decomposition temperature is from about 50° C. to about 95° C., and preferably is from about 65° C. to about 85° C. Examples of suitable first polymerization initiators include t-amyl peroxy pivalate, t-butyl peroxy-isobutyrate, t-amyl peroxy-2-ethyl-hexanoate, t-butyl peroxy-pivalate, t-butyl peroxy-maleic acid, 2,2'-azobis(isobutyronitrile, 2,2'-azobis(2-methyl butyronitrile), benzoyl peroxide, t-butyl peroxy-2-ethyl hexanoate, t-amyl peroxy-2-ethyl hexanoate (commercially available as Lupersol™ 575, Lucidol, Pennwalt Chemicals, Buffalo, N.Y.), and the like. The first initiator is added to the reaction mixture in any effective amount, typically from about 0.2 to about 3.5 percent by weight of the monomers.

The second polymerization initiator is a free radical initiator, such as a peroxide or an azo initiator whose 10 hour half-life is from about 85° C. to about 130° C., and preferably is from about 90° C. to about 105° C. Examples of suitable second polymerization initiators include t-butyl(2-ethyhexyl)-monoperoxy carbonate, ethyl 3,3-di(t-amyl peroxy)-butyrate, 2,2-di(t-amyl peroxy)-propane, 1,1-di(t-amyl peroxy)-cyclohexane, t-amyl peroxy-acetate, t-amyl peroxy-benzoate, di-t-butyl diperoxy-phthalate, di-t-butyl diperoxy-azelate, t-amyl(2-ethyhexyl)-monoperoxy carbonate (commercially available as Lupersol™ TAEC from Lucidol, Pennwalt Chemicals, Buffalo, N.Y.), and the like. The second initiator is added to the reaction mixture in any effective amount, typically from about 0.5 to about 5 percent by weight of the monomers.

The solvent employed for the reaction process can be any suitable solvent which is a good solvent for all the monomers, initiators and the polymeric product. It is also preferred that the solvent does not inhibit and affect adversely the kinetics of polymerization. Examples of suitable solvents include toluene, dimethyl formamide, ethyl acetate, cyclohexane, carbon tetrachloride, n-heptane, n-hexane, methyl ethyl ketone, xylene, tetrahydrofuran, and the like as well as mixtures thereof. The solvent is present in any effective amount, typically from about 20 to about 90 percent by weight of the entire solution.

The monomers, solvent, and initiators are introduced into a reaction vessel and purged by bubbling an inert gas, such as argon, nitrogen, or the like through the mixture. Purging is done at a rate of about 0.1 to 1 SCFH (standard cubic foot per hour) of inert gas per one gallon of vessel, for any effective period of time, typically from about 1 to about 10 minutes, and at any effective temperature, typically from about 20 to about 40° C. Subsequent to purging, the reaction vessel is sealed and pressurized with an inert gas to a pressure of from about 20 to about 600 kilopascals above ambient atmospheric pressure, preferably from about 50 to about 400 kilopascals above ambient atmospheric pressure, and more preferably from about 100 to about 250 kilopascals above ambient atmospheric pressure. The sealed pressurized reaction vessel is then heated to a temperature of from about 50 to about 100° C., preferably from about 70 to about 90° C. Heating can be at any effective rate; typical heating rates are from about 0.5 to about 2° C. per minute, and preferably from about 0.8 to about 1.2° C. per minute. Generally, the temperature selected within this range is a temperature at which the first initiator will become active and is about 10° C. below the 10 hour half-life decomposition temperature, and polymerization is initiated. The temperature is maintained in this range for a period of from about 60 to about 300 minutes, and preferably from about 120 to about 240 minutes.

Subsequently, the pressurized reaction vessel is heated to a temperature of from about 80 to about 115° C., preferably from about 100 to about 110° C. Heating can be at any effective rate; typical heating rates are from about 0.5 to about 2° C. per minute, and preferably from about 0.8 to about 1.2° C. per minute. The temperature is maintained in this range for a period of from about 30 to about 300 minutes, and preferably from about 90 to about 240 minutes.

Thereafter, the pressurized reaction vessel is heated to a temperature of from about 115 to about 140° C., preferably from about 120 to about 140° C. Heating can be at any effective rate; typical heating rates are from about 0.5 to about 2° C. per minute, and preferably from about 0.8 to about 1.2° C. per minute. The temperature is maintained in this range for a period of from about 30 to about 180 minutes, and preferably from about 30 to about 120 minutes.

After the final heating step, the solution containing the copolymer is cooled and the polymer thus formed is recovered. The cooling rate is not critical; cooling rates of about 0.5° C. per minute or more to a temperature of below 60° C. prior to discharging the copolymer solution are suitable.

The polymers obtained by the process of the present invention are particularly suitable for use as softenable materials in migration imaging members. One embodiment of the present invention is directed to a process for preparing a migration imaging member which comprises: (a) preparing a copolymer by a process which comprises, in the order stated: (1) adding monomers containing unsaturated carbon-to-carbon bonds, a first polymerization initiator, a second polymerization initiator, and a solvent to a reaction vessel; (2) purging the resulting solution with an inert gas; (3) sealing the reaction vessel and pressurizing it by addition of an inert gas to a pressure of from about 20 to about 600 kilopascals above ambient atmospheric pressure; (4) maintaining the temperature within the pressurized reaction vessel at a temperature of from about 50 to about 100° C. for a period of from about 60 to about 300 minutes; (5) thereafter maintaining the temperature within the pressurized reaction vessel at a temperature of from about 80 to about 115° C. for a period of from about 30 to about 300 minutes, wherein the temperature in step (5) is higher than the temperature in step (4); and (6) subsequently maintaining the temperature within the pressurized reaction vessel at a temperature of from about 115 to about 150° C. for a period of from about 30 to about 180 minutes, wherein the temperature in step (6) is higher than the temperature in step (5); (b) coating the copolymer thus prepared onto a substrate, thereby forming a softenable layer on the substrate; and (c) applying migration marking material to the softenable layer.

Figure 1:
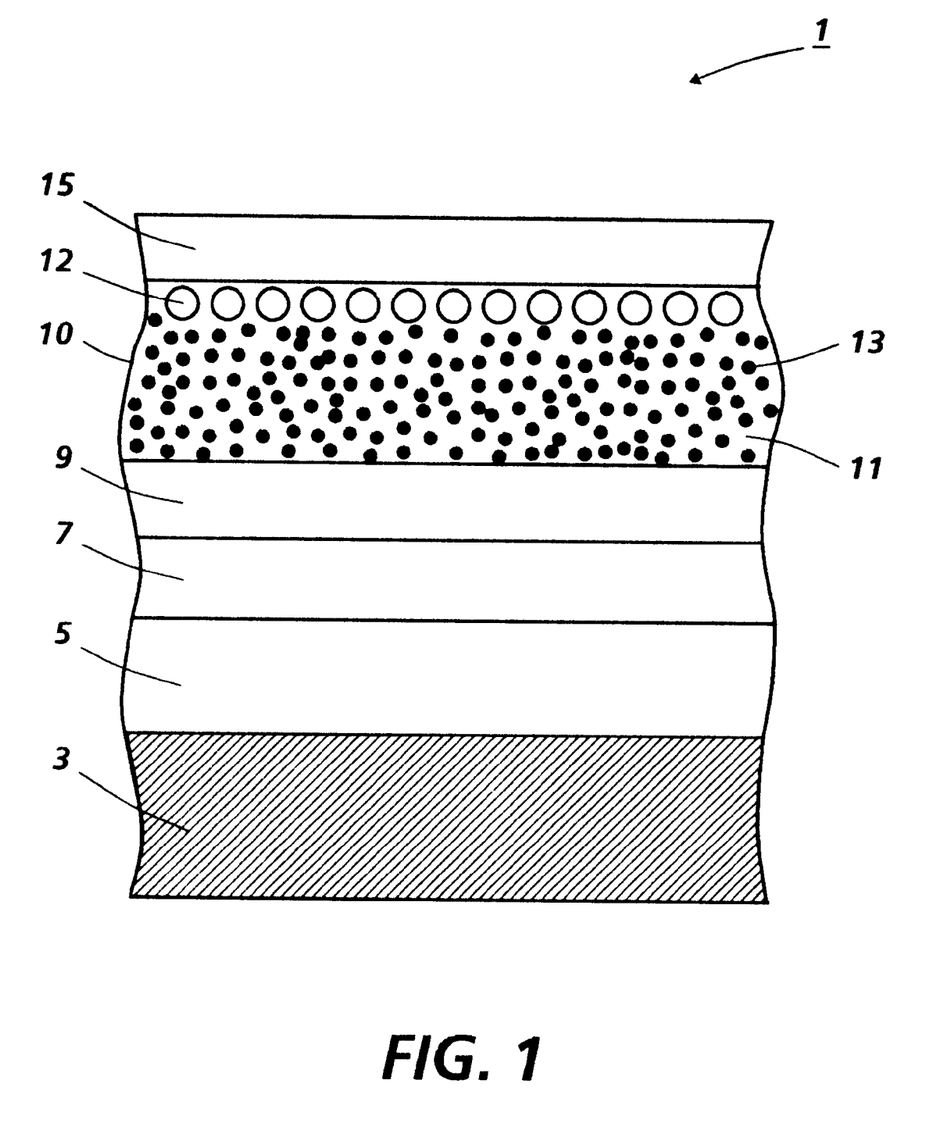

An example of a migration imaging member suitable for the process of the present invention is illustrated schematically in FIG. 1. As shown in FIG. 1, migration imaging member 1 comprises a substrate 3, an optional adhesive layer 5 situated on the substrate, an optional charge blocking layer 7 situated on optional adhesive layer 5, an optional charge transport layer 9 situated on optional charge blocking layer 7, and a softenable layer 10 situated on optional charge transport layer 9, said softenable layer 10 comprising softenable material 11, migration marking material 12 situated at or near the surface of the layer spaced from the substrate, and, optionally, charge transport material 13 dispersed throughout softenable material 11. Optional overcoating layer 15 is situated on the surface of softenable layer 10 spaced from the substrate 3. Any or all of the optional layers or materials can be absent from the imaging member. In addition, any of the optional layers present need not be in the order shown, but can be in any suitable arrangement. The migration imaging member can be in any suitable configuration, such as a web, a foil, a laminate, a strip, a sheet, a coil, a cylinder, a drum, an endless belt, an endless mobius strip, a circular disc, or any other suitable form.

The substrate can be either electrically conductive or electrically insulating. When conductive, the substrate can be opaque, translucent, semitransparent, or transparent, and can be of any suitable conductive material, including copper, brass, nickel, zinc, chromium, stainless steel, conductive plastics and rubbers, aluminum, semitransparent aluminum, steel, cadmium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. When insulative, the substrate can be opaque, translucent, semitransparent, or transparent, and can be of any suitable insulative material, such as paper, glass, plastic, polyesters such as Mylar® (available from DuPont) or Melinex® 442, (available from ICI Americas, Inc.), and the like. In addition, the substrate can comprise an insulative layer with a conductive coating, such as vacuum-deposited metallized plastic, such as titanized or aluminized Mylar® polyester, wherein the metallized surface is in contact with the softenable layer or any other layer situated between the substrate and the softenable layer. The substrate has an effective thickness, generally from about 6 to about 250 microns, and preferably from about 50 to about 200 microns.

The softenable layer can comprise one or more layers of softenable material comprising a polymer or mixture of polymers prepared according to the process of the present invention. The softenable material is soluble in a solvent or softenable, for example, in a solvent liquid, solvent vapor, heat, or any combinations thereof. When the softenable layer is to be softened or dissolved either during or after imaging, it should be soluble in a solvent that does not attack the migration marking material. By softenable is meant any material that can be rendered by a development step as described herein permeable to migration material migrating through its bulk. This permeability typically is achieved by a development step entailing dissolving, melting, or softening by contact with heat, vapors, partial solvents, as well as combinations thereof. The softenable layer can be of any effective thickness, generally from about 1 to about 30 microns, and preferably from about 2 to about 25 microns. The softenable layer can be applied to the conductive layer by any suitable coating process. Typical coating processes include draw bar coating, spray coating, solution coating, extrusion, dip coating, gravure roll coating, wire-wound rod coating, air knife coating, and the like. Typically, the solution containing the copolymer that results from the polymerization process of the present invention is diluted or concentrated to a concentration of about 10 percent by weight solids prior to the coating process. While the polymerization process typically results in a solution of the copolymer containing about 55 percent by weight solids, the polymerization process can be carried out under conditions that result in higher or lower solids concentrations.

The softenable layer also contains migration marking material. The migration marking material can be electrically photosensitive, photoconductive, or of any other suitable combination of materials, or possess any other desired physical property and still be suitable for use in the migration imaging members of the present invention. The migration marking materials preferably are particulate, wherein the particles are closely spaced from each other. Preferred migration marking materials generally are spherical in shape and submicron in size. The migration marking material generally is capable of substantial photodischarge upon electrostatic charging and exposure to activating radiation and is substantially absorbing and opaque to activating radiation in the spectral region where the photosensitive migration marking particles photogenerate charges. The migration marking material is generally present as a thin layer or monolayer of particles situated at or near the surface of the softenable layer spaced from the conductive layer. When present as particles, the particles of migration marking material preferably have an average diameter of up to about 2 microns, and more preferably of from about 0.1 to about 1 micron. The layer of migration marking particles is situated at or near that surface of the softenable layer spaced from or most distant from the substrate. Preferably, the particles are situated at a distance of from about 0.01 to about 0.1 micron from the layer surface, and more preferably from about 0.02 to about 0.08 micron from the layer surface. Preferably, the particles are situated at a distance of from about 0.005 to about 0.2 micron from each other, and more preferably at a distance of from about 0.05 to about 0.1 micron from each other, the distance being measured between the closest edges of the particles, i.e. from outer diameter to outer diameter. The migration marking material contiguous to the outer surface of the softenable layer is present in an effective amount, preferably from about 5 percent to about 25 percent by total weight of the softenable layer, and more preferably from about 10 to about 20 percent by total weight of the softenable layer.

Examples of suitable migration marking materials include selenium, alloys of selenium with alloying components such as tellurium, arsenic, mixtures thereof, and the like, phthalocyanines, and any other suitable materials as disclosed, for example, in U.S. Pat. No. 3,975,195 and other U.S. patents directed to migration imaging members and incorporated herein by reference.

The migration marking particles can be included in the imaging member by any suitable technique. For example, a layer of migration marking particles can be placed at or just below the surface of the softenable layer by solution coating the first conductive layer with the softenable layer material, followed by heating the softenable material in a vacuum chamber to soften it, while at the same time thermally evaporating the migration marking material onto the softenable material in a vacuum chamber. Other techniques for preparing monolayers include cascade and electrophoretic deposition. An example of a suitable process for depositing migration marking material in the softenable layer is disclosed in U.S. Pat. No. 4,482,622, the disclosure of which is totally incorporated herein by reference.

The migration imaging member optionally contains a charge transport material in the softenable layer. The charge transport material can be any suitable charge transport material either capable of acting as a softenable layer material or capable of being dissolved or dispersed on a molecular scale in the softenable layer material. When a charge transport material is also contained in another layer in the imaging member, preferably there is continuous transport of charge through the entire film structure. The charge transport material is defined as a material which is capable of improving the charge injection process for one sign of charge from the migration marking material into the softenable layer and also of transporting that charge through the softenable layer. The charge transport material can be either a hole transport material (transports positive charges) or an electron transport material (transports negative charges). Charge transporting materials are well known in the art. Typical charge transporting materials include the following:

Diamine transport molecules of the type described in U.S. Pat. Nos. 4,306,008, 4,304,829, 4,233,384, 4,115,116, 4,299,897, and 4,081,274, the disclosures of each of which are totally incorporated herein by reference. Typical diamine transport molecules include N,N'-diphenyl-N,N'-bis(3"-methylphenyl)-(1,1'-biphenyl)-4,4'-diamine, N,N'-diphenyl-N,N'-bis(4-methylphenyl)-(1,1'-biphenyl)-4,4'-diamine, N,N'-diphenyl-N,N'-bis(2-methylphenyl)-(1,1'-biphenyl)-4,4'-diamine, N,N'-diphenyl-N,N'-bis(3-ethylphenyl)-(1,1'-biphenyl)-4,4'-diamine, N,N'-diphenyl-N,N'-bis(4-ethylphenyl)-(1,1'-biphenyl)-4,4'-diamine, N,N'-diphenyl-N,N'-bis(4-n-butylphenyl)-(1,1'-biphenyl)-4,4'-diamine, N,N'-diphenyl-N,N'-bis(3-chlorophenyl)-[1,1'-biphenyl]-4,4'-diamine, N,N'-diphenyl-N,N'-bis(4-chlorophenyl)-[1,1'-biphenyl]-4,4'-diamine, N,N'-diphenyl-N,N'-bis(phenylmethyl)-[1,1'-biphenyl]-4,4'-diamine, N,N,N',N'-tetraphenyl-[2,2'-dimethyl-1,1'-biphenyl]-4,4'-diamine, N,N,N',N'-tetra-(4-methylphenyl)-[2,2'-dimethyl-1,1'-biphenyl]-4,4'-diamine, N,N'-diphenyl-N,N'-bis(4-methylphenyl)-[2,2'-dimethyl-1,1'-biphenyl]-4,4'-diamine, N,N'-diphenyl-N,N'-bis(2-methylphenyl)-[2,2'-dimethyl-1,1'-biphenyl]-4,4'-diamine, N,N'-diphenyl-N,N'-bis(3-methylphenyl)-[2,2'-dimethyl-1,1'-biphenyl]-4,4'-diamine, N,N'-diphenyl-N,N'-bis(3-methylphenyl)-pyrenyl-1,6-diamine, and the like.

Pyrazoline transport molecules as disclosed in U.S. Pat. Nos. 4,315,982, 4,278,746, and 3,837,851, the disclosures of each of which are totally incorporated herein by reference. Typical pyrazoline transport molecules include 1-[lepidyl-(2)]-3-(p-diethylaminophenyl)-5-(p-diethylaminophenyl)pyrazoline, 1-[quinolyl-(2)]-3-(p-diethylaminophenyl)-5-(p-diethylaminophenyl)pyrazoline, 1-[pyridyl-(2)]-3-(p-diethylaminostyryl)-5-(p-diethylaminophenyl)pyrazoline, 1-[6-methoxypyridyl-(2)]-3-(p-diethylaminostyryl)-5-(p-diethylaminophenyl) pyrazoline, 1-phenyl-3-[p-dimethylaminostyryl]-5-(p-dimethylaminostyryl)pyrazoline, 1-phenyl-3-[p-diethylaminostyryl]-5-(p-diethylaminostyryl)pyrazoline, and the like.

Substituted fluorene charge transport molecules as described in U.S. Pat. No. 4,245,021, the disclosure of which is totally incorporated herein by reference. Typical fluorene charge transport molecules include 9-(4'-dimethylaminobenzylidene)fluorene, 9-(4'-methoxybenzylidene)fluorene, 9-(2',4'-dimethoxybenzylidene)fluorene, 2-nitro-9-benzylidene-fluorene, 2-nitro-9-(4'-diethylaminobenzylidene)fluorene, and the like.

Oxadiazole transport molecules such as 2,5-bis(4-diethylaminophenyl)-1,3,4-oxadiazole, pyrazoline, imidazole, triazole, and the like. Other typical oxadiazole transport molecules are described, for example, in German Patent 1,058,836, German Patent 1,060,260, and German Patent 1,120,875, the disclosures of each of which are totally incorporated herein by reference.

Hydrazone transport molecules, such as p-diethylamino benzaldehyde-(diphenylhydrazone), o-ethoxy-p-diethylaminobenzaldehyde-(diphenylhydrazone), o-methyl-p-diethylaminobenzaldehyde-(diphenylhydrazone), o-methyl-p-dimethylaminobenzaldehyde-(diphenylhydrazone), 1-naphthalenecarbaldehyde 1-methyl-1-phenylhydrazone, 1-naphthalenecarbaldehyde 1,1-phenylhydrazone, 4-methoxynaphthlene-1-carbaldehyde 1-methyl-1-phenylhydrazone, and the like. Other typical hydrazone transport molecules are described, for example, in U.S. Pat. Nos. 4,150,987, 4,385,106, 4,338,388, and 4,387,147, the disclosures of each of which are totally incorporated herein by reference.

Carbazole phenyl hydrazone transport molecules such as 9-methylcarbazole-3-carbaldehyde-1,1-diphenylhydrazone, 9-ethylcarbazole-3-carbaldehyde-1-methyl-1-phenylhydrazone, 9-ethylcarbazole-3-carbaldehyde-1-ethyl-1-phenylhydrazone, 9-ethylcarbazole-3-carbaldehyde-1-ethyl-1-benzyl-1-phenylhydrazone, 9-ethylcarbazole-3-carbaldehyde-1,1-diphenylhydrazone, and the like. Other typical carbazole phenyl hydrazone transport molecules are described, for example, in U.S. Pat. Nos. 4,256,821 and 4,297,426, the disclosures of each of which are totally incorporated herein by reference.

Vinyl-aromatic polymers such as polyvinyl anthracene, polyacenaphthylene; formaldehyde condensation products with various aromatics such as condensates of formaldehyde and 3-bromopyrene; 2,4,7-trinitrofluorenone, and 3,6-dinitro-N-t-butylnaphthalimide as described, for example, in U.S. Pat. No. 3,972,717, the disclosure of which is totally incorporated herein by reference.

Oxadiazole derivatives such as 2,5-bis-(p-diethylaminophenyl)-oxadiazole-1,3,4 described in U.S. Pat. No. 3,895,944, the disclosure of which is totally incorporated herein by reference.

Tri-substituted methanes such as alkyl-bis(N,N-dialkylaminoaryl)methane, cycloalkyl-bis(N,N-dialkylaminoaryl)methane, and cycloalkenyl-bis(N,N-dialkylaminoaryl)methane as described in U.S. Pat. No. 3,820,989, the disclosure of which is totally incorporated herein by reference.

9-Fluorenylidene methane derivatives having the formula wherein X and Y are cyano groups or alkoxycarbonyl groups; A, B, and W are electron withdrawing groups independently selected from the group consisting of acyl, alkoxycarbonyl, nitro, alkylaminocarbonyl, and derivatives thereof; m is a number of from 0 to 2; and n is the number 0 or 1 as described in U.S. Pat. No. 4,474,865, the disclosure of which is totally incorporated herein by reference. Typical 9-fluorenylidene methane derivatives encompassed by the above formula include (4-n-butoxycarbonyl-9-fluorenylidene)malononitrile, (4-phenethoxycarbonyl-9-fluorenylidene)malononitrile, (4-carbitoxy-9-fluorenylidene)malononitrile, (4-n-butoxycarbonyl-2,7-dinitro-9-fluorenylidene)malonate, and the like.

Other charge transport materials include poly-1-vinylpyrene, poly-9-vinylanthracene, poly-9-(4-pentenyl)-carbazole, poly-9-(5-hexyl)-carbazole, polymethylene pyrene, poly-1-(pyrenyl)-butadiene, polymers such as alkyl, nitro, amino, halogen, and hydroxy substitute polymers such as poly-3-amino carbazole, 1,3-dibromo-poly-N-vinyl carbazole, 3,6-dibromo-poly-N-vinyl carbazole, and numerous other transparent organic polymeric or non-polymeric transport materials as described in U.S. Pat. No. 3,870,516, the disclosure of which is totally incorporated herein by reference. Also suitable as charge transport materials are phthalic anhydride, tetrachlorophthalic anhydride, benzil, mellitic anhydride, S-tricyanobenzene, picryl chloride, 2,4-dinitrochlorobenzene, 2,4-dinitrobromobenzene, 4-nitrobiphenyl, 4,4-dinitrophenyl, 2,4,6-trinitroanisole, trichlorotrinitrobenzene, trinitro-O-toluene, 4,6-dichloro-1, 3-dinitrobenzene, 4,6-dibromo-1,3-dinitrobenzene, P-dinitrobenzene, chloranil, bromanil, and mixtures thereof, 2,4,7-trinitro-9-fluorenone, 2,4,5,7-tetranitrofluorenone, trinitroanthracene, dinitroacridene, tetracyanopyrene, dinitroanthraquinone, polymers having aromatic or heterocyclic groups with more than one strongly electron withdrawing. substituent such as nitro, sulfonate, carboxyl, cyano, or the like, including polyesters, polysiloxanes, polyamides, polyurethanes, and epoxies, as well as block, graft, or random copolymers containing the aromatic moiety, and the like, as well as mixtures thereof, as described in U.S. Pat. No. 4,081,274, the disclosure of which is totally incorporated herein by reference.

When the charge transport molecules are combined with the softenable material to form the softenable layer, the amount of charge transport molecule which is used can vary depending upon the particular charge transport material and its compatibility (e.g. solubility) in the softenable matrix layer and the like. Satisfactory results have been obtained using between about 5 percent to about 50 percent by weight charge transport molecule based on the total weight of the softenable layer. A particularly preferred charge transport molecule is one having the general formula wherein X, Y and Z are selected from the group consisting of hydrogen, an alkyl group having from 1 to about 20 carbon atoms and chlorine, and at least one of X, Y and Z is independently selected to be an alkyl group having from 1 to about 20 carbon atoms or chlorine. If Y and Z are hydrogen, the compound can be named N,N'-diphenyl-N, N'-bis(alkylphenyl)-[1,1'-biphenyl]-4,4'-diamine wherein the alkyl is, for example, methyl, ethyl, propyl, n-butyl, or the like, or the compound can be N,N'-diphenyl-N,N'-bis (chlorophenyl)-[1,1'-biphenyl]-4,4'-diamine. Excellent results can be obtained when the softenable layer contains between about 8 percent to about 40 percent by weight of these diamine compounds based on the total weight of the softenable layer. Optimum results are achieved when the softenable layer contains between about 16 percent to about 32 percent by weight of N,N'-diphenyl-N,N'-bis(3"-methylphenyl)-(1,1'-biphenyl)-4,4'-diamine based on the total weight of the softenable layer.

When present, the charge transport material is present in the softenable material in an effective amount, generally from about 5 to about 50 percent by weight and preferably from about 8 to about 40 percent by weight. The charge transport material can be incorporated into the softenable layer by any suitable technique. For example, it can be mixed with the softenable layer components by dissolution in a common solvent. If desired, a mixture of solvents for the charge transport material and the softenable layer material can be employed to facilitate mixing and coating. The charge transport molecule and softenable layer mixture can be applied to the substrate by any conventional coating process. Typical coating processes include draw bar coating, spray coating, extrusion, dip coating, solution coating, gravure roll coating, wire-wound rod coating, air knife coating, and the like.

The optional adhesive layer can include any suitable adhesive material. Typical adhesive materials include copolymers of styrene and an acrylate, polyester resin such as DuPont 49000 (available from E.I. DuPont & de Nemours Company), copolymer of acrylonitrile and vinylidene chloride, polyvinyl acetate, polyvinyl butyral and the like and mixtures thereof. The adhesive layer can have a thickness of from about 0.05 to about 1 micron. When an adhesive layer is employed, it preferably forms a uniform and continuous layer having a thickness of about 0.5 micron or less. It can also optionally include charge transport molecules.

The optional charge transport layer can comprise any suitable film forming binder material. Typical film forming binder materials include styrene acrylate copolymers, polycarbonates, co-polycarbonates, polyesters, co-polyesters, polyurethanes, polyvinyl acetate, polyvinyl butyral, polystyrenes, alkyd substituted polystyrenes, styrene-olefin copolymers, styrene-co-n-hexylmethacrylate, a custom synthesized 80/20 mole percent copolymer of styrene and hexylmethacrylate having an intrinsic viscosity of 0.179 deciliter per gram; other copolymers of styrene and hexylmethacrylate, styrene-vinyltoluene copolymers, polyalphamethylstyrene, mixtures thereof, and copolymers thereof. The above group of materials is not intended to be limiting, but merely illustrative of materials suitable as film forming binder materials in the optional charge transport layer. The film forming binder material typically is substantially electrically insulating. Although the optional charge transport layer has been described as coated on a substrate, in some embodiments, the charge transport layer itself can have sufficient strength and integrity to be substantially self supporting and can, if desired, be brought into contact with a suitable conductive substrate during the imaging process. As is well known in the art, a uniform deposit of electrostatic charge of suitable polarity can be substituted for a conductive layer. Alternatively, a uniform deposit of electrostatic charge of suitable polarity on the exposed surface of the charge transport spacing layer can be substituted for a conductive layer to facilitate the application of electrical migration forces to the migration layer. This technique of "double charging" is well known in the art. The charge transport layer is of an effective thickness, generally from about 1 to about 25 microns, and preferably from about 2 to about 20 microns.

Charge transport molecules suitable for the charge transport layer are described in detail herein. The specific charge transport molecule utilized in the charge transport layer of any given imaging member can be identical to or different from a charge transport molecule employed in an adjacent softenable layer. Similarly, the concentration of the charge transport molecule utilized in the charge transport spacing layer of any given imaging member can be identical to or different from the concentration of charge transport molecule employed in an adjacent softenable layer. When the charge transport material and film forming binder are combined to form a charge transport spacing layer, the amount of charge transport material used can vary depending upon the particular charge transport material and its compatibility (e.g. solubility) in the continuous insulating film forming binder. Satisfactory results have been obtained using between about 5 percent and about 50 percent based on the total weight of the optional charge transport spacing layer, although the amount can be outside of this range. The charge transport material can be incorporated into the charge transport layer by similar techniques to those employed for the softenable layer.

The optional charge blocking layer can be of various suitable materials, provided that the objectives of the present invention are achieved, including aluminum oxide, polyvinyl butyral, silane and the like, as well as mixtures thereof. This layer, which is generally applied by known coating techniques, is of an effective thickness, generally from about 0.05 to about 0.5 micron, and preferably from about 0.05 to about 0.1 micron. Typical coating processes include draw bar coating, spray coating, extrusion, dip coating, gravure roll coating, solution coating, wire-wound rod coating, air knife coating, and the like.

The optional overcoating layer can be substantially electrically insulating, or have any other suitable properties. The overcoating preferably is substantially transparent, at least in the spectral region where electromagnetic radiation is used for the imagewise exposure step of an imaging member and for the uniform exposure step when the member is used as a master in a xeroprinting process. The overcoating layer is continuous and preferably of a thickness up to about 1 to 2 microns. More preferably, the overcoating has a thickness of from about 0.1 to about 0.5 micron to minimize residual charge buildup. Overcoating layers greater than about 1 to 2 microns thick can also be used. Typical overcoating materials include acrylic-styrene copolymers, methacrylate polymers, methacrylate copolymers, styrene-butylmethacrylate copolymers, butylmethacrylate resins, vinylchloride copolymers, fluorinated homo or copolymers, high molecular weight polyvinyl acetate, organosilicon polymers and copolymers, polyesters, polycarbonates, polyamides, polyvinyl toluene and the like. The overcoating layer generally protects the softenable layer to provide greater resistance to the adverse effects of abrasion during handling, and, if the imaged member is to be used in xeroprinting processes, during master making and xeroprinting. The overcoating layer preferably adheres strongly to the softenable layer to minimize damage. The overcoating layer can also have abhesive properties at its outer surface which provide improved resistance to toner filming during toning, transfer, and/or cleaning. The abhesive properties can be inherent in the overcoating layer or can be imparted to the overcoating layer by incorporation of another layer or component of abhesive material. These abhesive materials should not degrade the film forming components of the overcoating and preferably have a surface energy of less than about 20 ergs per square centimeter. Typical abhesive materials include fatty acids, salts and esters, fluorocarbons, silicones, and the like. The coatings can be applied by any suitable technique such as draw bar, solution, spray, dip, melt, extrusion or gravure coating. It will be appreciated that these overcoating layers protect the imaging member before imaging, during imaging, after the members have been imaged, and during xeroprinting.

One embodiment of the present invention is directed to an imaging process which comprises: (a) preparing an imaging member by (1) preparing a copolymer by a process which comprises, in the order stated: (a) adding monomers containing unsaturated carbon-to-carbon bonds, a first polymerization initiator, a second polymerization initiator, and a solvent to a reaction vessel; (b) purging the resulting solution with an inert gas; (c) sealing the reaction vessel and pressurizing it by addition of an inert gas to a pressure of from about 20 to about 600 kilopascals above ambient atmospheric pressure; (d) maintaining the temperature within the pressurized reaction vessel at a temperature of from about 50 to about 100° C. for a period of from about 60 to about 300 minutes; (e) thereafter maintaining the temperature within the pressurized reaction vessel at a temperature of from about 80 to about 115° C. for a period of from about 30 to about 300 minutes, wherein the temperature in step (e) is higher than the temperature in step (d); and (f) subsequently maintaining the temperature within the pressurized reaction vessel at a temperature of from about 115 to about 160° C. for a period of from about 30 to about 180 minutes, wherein the temperature in step (f) is higher than the temperature in step (e); (3) coating the copolymer thus prepared onto a substrate, thereby forming a softenable layer on the substrate; and (3) applying migration marking material to the softenable layer; (b) uniformly charging the imaging member; (c) exposing the charged imaging member to activating radiation in an imagewise pattern, thereby forming an electrostatic latent image on the imaging member; and (d) causing the softenable layer to soften, thereby enabling migration marking material to migrate through the softenable layer toward the substrate in imagewise fashion.

The migration imaging member can be imaged by connecting the conductive substrate layer to a reference potential such as a ground, uniformly charging in the dark the surface of the member spaced from the conductive layer to either a negative polarity or to a positive polarity, and subsequently exposing the charged surface of the imaging member to activating radiation, such as light, in an imagewise pattern, thereby forming an electrostatic latent image on the member surface. Subsequently, the migration imaging member is developed by any suitable method, such as application of heat, solvent vapors, solvent liquids, combinations thereof, or the like, thereby causing the softenable material to soften and enabling the migration marking particles to migrate through the softenable material toward the conductive layer. For heat development, the heat development temperature and time depend upon factors such as how the heat energy is applied (e.g. conduction, radiation, convection, and the like), the melt viscosity of the softenable layer, thickness of the softenable layer, the amount of heat energy, and the like. For example, at a temperature of 110° C. to about 130° C., heat need only be applied for a few seconds. For lower temperatures, more heating time may be required. When the heat is applied, the softenable material decreases in viscosity, thereby decreasing its resistance to migration of the marking material through the softenable layer. In the exposed areas of the imaging member, the migration marking material gains a substantial net charge which, upon softening of the softenable material, causes the exposed marking material to migrate in image configuration towards the substrate and disperse in the softenable layer, resulting in a $D_{min}$ area. The unexposed migration marking particles in the unexposed areas of the imaging member remain essentially neutral and uncharged. Thus, in the absence of migration force, the unexposed migration marking particles remain substantially in their original position in the softenable layer, resulting in a $D_{max}$ area. Thus, the developed image is an optically sign-retaining visible image of an original (if a conventional light-lens exposure system is utilized). Exposure can also be by means other than light-lens systems, including raster output scanning devices such as laser writers. The application of heat should be sufficient to decrease the resistance of the softenable material of the softenable layer to allow migration of the migration marking material through the softenable layer in imagewise configuration. With heat development, satisfactory results can be achieved by heating the imaging member to a temperature of about 100° C. to about 130° C. for only a few seconds when the unovercoated softenable layer contains a custom synthesized 80/20 mole percent copolymer of styrene and hexylmethacrylate having an intrinsic viscosity of 0.179 dl/gm and N,N'-diphenyl-N,N'-bis(3"-methylphenyl)-(1,1'-biphenyl)-4,4'-diamine. The test for a satisfactory combination of time and temperature is to maximize optical contrast density and electrostatic contrast potential. The developed imaging member is transmitting to visible light in the exposed region because of the depthwise migration and dispersion of the migration marking material in the exposed region. The $D_{min}$ obtained in the exposed region generally is slightly higher than the optical density of transparent substrates underlying the softenable layer. The $D_{max}$ in the unexposed region generally is essentially the same as the original unprocessed imaging member because the positions of migration marking particles in the unexposed regions remain essentially unchanged.

When the softenable layer contains a charge transport material, the developed imaging member can then, if desired, be employed as a xeroprinting master in a xeroprinting process. One embodiment of the present invention is directed to a xeroprinting process which comprises: (a) preparing a xeroprinting master by (1) preparing a copolymer by a process which comprises, in the order stated: (a) adding monomers containing unsaturated carbon-to-carbon bonds, a first polymerization initiator, a second polymerization initiator, and a solvent to a reaction vessel; (b) purging the resulting solution with an inert gas; (c) sealing the reaction vessel and pressurizing it by addition of an inert gas to a pressure of from about 20 to about 600 kilopascals above ambient atmospheric pressure; (d) maintaining the temperature within the pressurized reaction vessel at a temperature of from about 50 to about 100° C. for a period of from about 60 to about 300 minutes; (e) thereafter maintaining the temperature within the pressurized reaction vessel at a temperature of from about 80 to about 115° C. for a period of from about 30 to about 300 minutes, wherein the temperature in step (e) is higher than the temperature in step (d); and (f) subsequently maintaining the temperature within the pressurized reaction vessel at a temperature of from about 115 to about 160° C. for a period of from about 30 to about 160 minutes, wherein the temperature in step (f) is higher than the temperature in step (e); (2) coating a mixture comprising a charge transport material and the copolymer thus prepared onto a substrate, thereby forming a softenable layer on the substrate; and (3) applying migration marking material to the softenable layer, thereby forming an imaging member; (b) uniformly charging the imaging member; (c) exposing the charged imaging member to activating radiation in an imagewise pattern, thereby forming an electrostatic latent image on the imaging member; (d) causing the softenable layer to soften, thereby enabling migration marking material to migrate through the softenable layer toward the substrate in imagewise fashion to form a migrated image, thereby forming a xeroprinting master; (e) uniformly charging the xeroprinting master; (f) uniformly exposing the charged master to activating radiation to result in an electrostatic latent image corresponding to the migration image; (g) developing the electrostatic latent image with a toner; and (h) transferring the developed image to a receiver sheet.

The xeroprinting process generally entails uniformly charging the developed imaging member (now a xeroprinting master) by a charging means such as a corona charging device. Generally, charging the developed imaging member to either a positive or negative voltage of from about 50 to about 1200 volts is suitable for the process of the present invention, although other values can be employed. The charged xeroprinting master is then uniformly flash exposed to activating radiation such as light energy to form an electrostatic latent image. The activating electromagnetic radiation used for the uniform exposure step should be in the spectral region where the migration marking particles photogenerate charge carriers. Light in the spectral region of 300 to 800 nanometers is generally suitable for the process of the present invention, although the wavelength of the light employed for exposure can be outside of this range, and is selected according to the spectral response of the specific migration marking particles selected. The exposure energy should be such that the desired and/or optimal electrostatic contrast potential is obtained, and preferably is from about 10 ergs per square centimeter to about 100,000 ergs per square centimeter. Because of the differences in the relative positions (or particle distribution) of the migration marking material in the $D_{max}$ and $D_{min}$ areas of the softenable layer, the $D_{max}$ and $D_{min}$ areas exhibit different photodischarge characteristics and optical absorption characteristics. Furthermore, the photodischarge characteristics can depend on the polarity of charging. For example, when a master with a hole transport material (capable of transporting positive charges) is charged negatively, the $D_{min}$ areas of the master may photodischarge almost completely while the $D_{max}$ areas photodischarge very little. However, with positive charging, the $D_{max}$ areas of the same master may photodischarge almost completely while the $D_{min}$ areas photodischarge substantially less. Preferably, the potential difference between the migrated areas of the master and the unmigrated areas of the master is from about 50 to about 1200 volts, although this value can be outside of the specified range. Contrast potential efficiency is determined by dividing the potential difference between the migrated areas of the master and the unmigrated areas of the master by the initial voltage to which the master was charged prior to flood exposure and multiplying by 100 to obtain a percentage figure.

Subsequently, the electrostatic latent image formed by flood exposing the charged master to light is developed with toner particles to form a toner image corresponding to the electrostatic latent image. For example, with negative charging, the electrostatic latent image is negatively charged and overlays the $D_{max}$ areas of the xeroprinting master. The toner particles carry a positive electrostatic charge and are attracted to the oppositely charged portions overlying the $D_{max}$ area (unmigrated particles). However, if desired, the toner can be deposited in the discharged areas by employing toner particles having the same polarity as the charged areas. The toner particles will then be repelled by the charges overlying the $D_{max}$ area and deposit in the discharged areas ($D_{min}$ area). Well known electrically biased development electrodes can also be employed, if desired, to direct toner particles to either the charged or discharged areas of the imaging surface.

The developing (toning) step is identical to that conventionally used in electrophotographic imaging. Any suitable conventional electrophotographic dry or liquid developer containing electrostatically attractable marking particles can be employed to develop the electrostatic latent image on the xeroprinting master. Typical dry toners have a particle size of from about 6 to about 20 microns. Typical liquid toners have a particle size of from about 0.1 to about 6 microns. The size of toner particles generally affects the resolution of prints. For applications demanding very high resolution, such as in color proofing and printing, liquid toners are generally preferred because their much smaller toner particle size gives better resolution of fine half-tone dots and produce four color images without undue thickness in densely toned areas. Conventional electrophotographic development techniques can be utilized to deposit the toner particles on the imaging surface of the xeroprinting master.

This invention is suitable for development with dry two-component developers. Two-component developers comprise toner particles and carrier particles. Typical toner particles can be of any composition suitable for development of electrostatic latent images, such as those comprising a resin and a colorant. Typical toner resins include polyesters, polyamides, epoxies, polyurethanes, diolefins, vinyl resins and polymeric esterification products of a dicarboxylic acid and a diol comprising a diphenol. Examples of vinyl monomers include styrene, p-chlorostyrene, vinyl naphthalene, unsaturated mono-olefins such as ethylene, propylene, butylene, isobutylene and the like; vinyl halides such as vinyl chloride, vinyl bromide, vinyl fluoride, vinyl acetate, vinyl propionate, vinyl benzoate, and vinyl butyrate; vinyl esters such as esters of monocarboxylic acids, including methyl acrylate, ethyl acrylate, n-butyl acrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate, and the like; acrylonitrile, methacrylonitrile, acrylamide, vinyl ethers, including vinyl methyl ether, vinyl isobutyl ether, and vinyl ethyl ether; vinyl ketones such as vinyl methyl ketone, vinyl hexyl ketone, and methyl isopropenyl ketone; N-vinyl indole and N-vinyl pyrrolidene; styrene butadienes; mixtures of these monomers; and the like. The resins are generally present in an amount of from about 30 to about 99 percent by weight of the toner composition, although they can be present in greater or lesser amounts, provided that the objectives of the invention are achieved.

Any suitable pigments or dyes or mixture thereof can be employed in the toner particles. Typical pigments or dyes include carbon black, nigrosine dye, aniline blue, magnetites, and mixtures thereof, with carbon black being a preferred colorant. The pigment is preferably present in an amount sufficient to render the toner composition highly colored to permit the formation of a clearly visible image on a recording member. Generally, the pigment particles are present in amounts of from about 1 percent by weight to about 20 percent by weight based on the total weight of the toner composition; however, lesser or greater amounts of pigment particles can be present provided that the objectives of the present invention are achieved.

Other colored toner pigments include red, green, blue, brown, magenta, cyan, and yellow particles, as well as mixtures thereof. Illustrative examples of suitable magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. These color pigments are generally present in an amount of from about 15 weight percent to about 20.5 weight percent based on the weight of the toner resin particles, although lesser or greater amounts can be present provided that the objectives of the present invention are met.

When the pigment particles are magnetites, which comprise a mixture of iron oxides ($Fe_3O_4$) such as those commercially available as Mapico Black, these pigments are present in the toner composition in an amount of from about 10 percent by weight to about 70 percent by weight, and preferably in an amount of from about 20 percent by weight to about 50 percent by weight, although they can be present in greater or lesser amounts, provided that the objectives of the invention are achieved.

The toner compositions can be prepared by any suitable method. For example, the components of the dry toner particles can be mixed in a ball mill, to which steel beads for agitation are added in an amount of approximately five times the weight of the toner. The ball mill can be operated at about 120 feet per minute for about 30 minutes, after which time the steel beads are removed. Dry toner particles for two-component developers generally have an average particle size between about 6 microns and about 20 microns.

Any suitable external additives can also be utilized with the dry toner particles. The amounts of external additives are measured in terms of percentage by weight of the toner composition, but are not themselves included when calculating the percentage composition of the toner. For example, a toner composition containing a resin, a pigment, and an external additive can comprise 80 percent by weight resin and 20 percent by weight pigment; the amount of external additive present is reported in terms of its percent by weight of the combined resin and pigment. External additives can include any additives suitable for use in electrostatographic toners, including straight silica, colloidal silica (e.g. Aerosil R972®, available from Degussa, Inc.), ferric oxide, unilin, polypropylene waxes, polymethylmethacrylate, zinc stearate, chromium oxide, aluminum oxide, stearic acid, polyvinylidene flouride (e.g. Kynar®, available from Pennwalt Chemicals Corporation), and the like. External additives can be present in any suitable amount, provided that the objectives of the present invention are achieved.

Any suitable carrier particles can be employed with the toner particles. Typical carrier particles include granular zircon, steel, nickel, iron ferrites, and the like. Other typical carrier particles include nickel berry carriers as disclosed in U.S. Pat. No. 3,847,604, the entire disclosure of which is incorporated herein by reference. These carriers comprise nodular carrier beads of nickel characterized by surfaces of reoccurring recesses and protrusions that provide the particles with a relatively large external area. The diameters of the carrier particles can vary, but are generally from about 50 microns to about 1,000 microns, thus allowing the particles to possess sufficient density and inertia to avoid adherence to the electrostatic images during the development process. Carrier particles can possess coated surfaces. Typical coating materials include polymers and terpolymers, including, for example, fluoropolymers such as polyvinylidene fluorides as disclosed in U.S. Pat. Nos. 3,526,533, 3,849,186, and 3,942,979, the disclosures of each of which are totally incorporated herein by reference. The toner may be present, for example, in the two-component developer in an amount equal to about 1 to about 5 percent by weight of the carrier, and preferably is equal to about 3 percent by weight of the carrier.

Typical dry toners are disclosed, for example, in U.S. Pat. Nos. 2,788,288, 3,079,342, and U.S. Pat. Reissue 25,136, the disclosures of each of which are totally incorporated herein by reference.

If desired, development can be effected with liquid developers. Liquid developers are disclosed, for example, in U.S. Pat. Nos. 2,890,174 and 2,899,335, the disclosures of each of which are totally incorporated herein by reference. Liquid developers can comprise aqueous based or oil based inks, and include both inks containing a water or oil soluble dye substance and pigmented inks. Typical dye substances are Methylene Blue, commercially available from Eastman Kodak Company, Brilliant Yellow, commercially available from the Harlaco Chemical Company, potassium permanganate, ferric chloride and Methylene Violet, Rose Bengal and Quinoline Yellow, the latter three available from Allied Chemical Company, and the like. Typical pigments are carbon black, graphite, lamp black, bone black, charcoal, titanium dioxide, white lead, zinc oxide, zinc sulfide, iron oxide, chromium oxide, lead chromate, zinc chromate, cadmium yellow, cadmium red, red lead, antimony dioxide, magnesium silicate, calcium carbonate, calcium silicate, phthalocyanines, benzidines, naphthols, toluidines, and the like. The liquid developer composition can comprise a finely divided opaque powder, a high resistance liquid, and an ingredient to prevent agglomeration. Typical high resistance liquids include such organic dielectric liquids as paraffinic hydrocarbons such as the Isopar® and Norpar® family, carbon tetrachloride, kerosene, benzene, trichloroethylene, and the like. Other liquid developer components or additives include vinyl resins, such as carboxy vinyl polymers, polyvinylpyrrolidones, methylvinylether maleic anhydride interpolymers, polyvinyl alcohols, cellulosics such as sodium carboxy-ethylcellulose, hydroxypropylmethyl cellulose, hydroxyethyl cellulose, methyl cellulose, cellulose derivatives such as esters and ethers thereof, alkali soluble proteins, casein, gelatin, and acrylate salts such as ammonium polyacrylate, sodium polyacrylate, and the like.

Any suitable conventional electrophotographic development technique can be utilized to deposit toner particles on the electrostatic latent image on the imaging surface of the xeroprinting master. Well known electrophotographic development techniques include magnetic brush development, cascade development, powder cloud development, electrophoretic development, and the like. Magnetic brush development is more fully described, for example, in U.S. Pat. No. 2,791,949, the disclosure of which is totally incorporated herein by reference; cascade development is more fully described, for example, in U.S. Pat. Nos. 2,618,551 and 2,618,552, the disclosures of each of which are totally incorporated herein by reference; powder cloud development is more fully described, for example, in U.S. Pat. Nos. 2,725,305, 2,918,910, and 3,015,305, the disclosures of each of which are totally incorporated herein by reference; and liquid development is more fully described, for example, in U.S. Pat. No. 3,084,043, the disclosure of which is totally incorporated herein by reference.

The deposited toner image is subsequently transferred to a receiving member, such as paper, by, for example, applying an electrostatic charge to the rear surface of the receiving member by means of a charging means such as a corona device. If desired, the transferred toner image is thereafter fused to the receiving member by conventional means (not shown) such as an oven fuser, a hot roll fuser, a cold pressure fuser, or the like.

The deposited toner image can be transferred to a receiving member such as paper or transparency material by any suitable technique conventionally used in electrophotography, such as corona transfer, pressure transfer, adhesive transfer, bias roll transfer, and the like. Typical corona transfer entails contacting the deposited toner particles with a sheet of paper and applying an electrostatic charge on the side of the sheet opposite to the toner particles. A single wire corotron having applied thereto a potential of between about 5000 and about 8000 volts provides satisfactory transfer.

After transfer, the transferred toner image can be fixed to the receiving sheet. The fixing step can be also identical to that conventionally used in electrophotographic imaging. Typical, well known electrophotographic fusing techniques include heated roll fusing, flash fusing, oven fusing, laminating, adhesive spray fixing, and the like.

After the toned image is transferred, the xeroprinting master can be cleaned, if desired, to remove any residual toner and then erased by an AC corotron, or by any other suitable means. The developing, transfer, fusing, cleaning and erasure steps can be identical to that conventionally used in xerographic imaging. Since the xeroprinting master produces identical successive images in precisely the same areas, it has not been found necessary to erase the electrostatic latent image between successive images. However, if desired, the master can optionally be erased by conventional AC corona erasing techniques, which entail exposing the imaging surface to AC corona discharge to neutralize any residual charge on the master. Typical potentials applied to the corona wire of an AC corona erasing device range from about 3 kilovolts to about 10 kilovolts.

If desired, the imaging surface of the xeroprinting master can be cleaned. Any suitable cleaning step that is conventionally used in electrophotographic imaging can be employed for cleaning the xeroprinting master of this invention. Typical well known electrophotographic cleaning techniques include brush cleaning, blade cleaning, web cleaning, and the like.

After transfer of the deposited toner image from the master to a receiving member, the master can, with or without erase and cleaning steps, be cycled through additional uniform charging, uniform illumination, development and transfer steps to prepare additional imaged receiving members.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A terpolymer of styrene, ethyl acrylate, and acrylic acid was prepared according to the process of the present invention as follows. To a 100 gallon stainless steel reactor was added 108.4 kilograms of styrene (obtained from Dow Chemical Company, Sarnia, Ontario), 49.8 kilograms of ethyl acrylate (obtained from Rohm and Haas Company, Philadelphia), 2.41 kilograms of acrylic acid (obtained from Rohm and Haas Company, Philadelphia), 1.93 kilograms of t-amyl peroxy-2-ethyl hexanoate (Lupersol™ 575, obtained from Pennwalt Corporation, Buffalo, N.Y., a free radical initiator with a 10 hour half life at 75° C.), 4.82 kilograms of t-amyl-0-(2-ethyl hexyl monoperoxy carbonate) (Lupersol™ TAEC, obtained from Pennwalt Corporation, Buffalo, N.Y., a free radical initiator with a 10 hour half life at 98° C.), and 130 kilograms of toluene. The reactor was then purged with nitrogen gas at 10 SCFH (Standard Cubic Foot per Hour) for 5 minutes. Subsequently, the reactor was sealed and pressurized with nitrogen gas to a pressure of 250 kilopascals (kPa) above ambient atmospheric pressure. Polymerization was then carried out by heating the reaction mixture at a rate of 1.5° C. per minute to 87° C. and maintaining that temperature for 3.5 hours, followed by heating the mixture at a rate of 1.5° C. per minute to 108° C. and maintaining it at that temperature for 2 hours, and then followed by heating the mixture at a rate of 1.5° C. per minute to 127° C. and maintaining it at that temperature for 1 hour. Subsequently, the reaction mixture was cooled at a rate of 2° C. per minute to 50° C. and discharged into metal drums. The resulting terpolymer contained styrene in an amount of 67.5 percent by weight, ethyl acrylate in an amount of 31 percent by weight, and acrylic acid in an amount of 1.5 percent by weight. Analysis of the terpolymer solution by gas chromatography for residual monomer contents indicated that no detectable levels of residual styrene or residual ethyl acrylate remained in the solution. The terpolymer obtained exhibited the following characteristics:

| Glass Transition Temperature (° C.) | $M_w/M_n$ | Viscosity (at 110° C.) (poise) |
|---|---|---|
| 54 | 29,000/8,000 | $5 \times 10^4$ |

EXAMPLE I

These results indicate that, for applications such as softenable materials in migration imaging members and xeroprinting masters, the polymer obtained exhibited a good glass transition temperature, a good polydispersity of 3.67, and a good melt viscosity.

Comparative Example A

A terpolymer of styrene, ethyl acrylate, and acrylic acid was prepared as follows. To a 1 liter Parr reactor was added 272.3 grams of styrene (obtained from Dow Chemical Company, Sarnia, Ontario), 125.1 grams of ethyl acrylate (obtained from Rohm and Haas Company, Philadelphia), 6 grams of acrylic acid (obtained from Rohm and Haas Company, Philadelphia), 4.8 grams of t-amyl peroxy-2-ethyl hexanoate (Lupersol™ 575, obtained from Pennwalt Corporation, Buffalo, N.Y., a free radical initiator with a 10 hour half life at 75° C.), 12 grams of t-amyl-0-(2-ethyl hexyl monoperoxy carbonate) (Lupersol™ TAEC, obtained from Pennwalt Corporation, Buffalo, N.Y., a free radical initiator with a 10 hour half life at 98° C.), and 325 grams of toluene. The reactor was then purged with nitrogen gas at 0.05 SCFH (Standard Cubic Foot per Hour) for 2 minutes. Subsequently, the reactor was sealed and pressurized with nitrogen gas to a pressure of 250 kilopascals (kPa) above ambient atmospheric pressure. Polymerization was then carried out by heating the reaction mixture at a rate of 1.5° C. per minute to 92° C. and maintaining that temperature for 3 hours, followed by heating the mixture at a rate of 1.5° C. per minute to 123° C. and maintaining it at that temperature for 2.5 hours. Subsequently, the reaction mixture was cooled at a rate of 2° C. per minute to 25° C. and discharged into a 1 liter glass jar. The resulting terpolymer contained styrene in an amount of 67.5 percent by weight, ethyl acrylate in an amount of 31 percent by weight, and acrylic acid in an amount of 1.5 percent by weight. Analysis of the terpolymer solution by gas chromatography for residual monomer contents indicated that about 0.64 percent of residual styrene and about 0.2 percent of residual ethyl acrylate based on 56 percent by weight of solids remained in the solution. The terpolymer obtained exhibited the following characteristics:

| Glass Transition Temperature (° C.) | $M_w/M_n$ | Viscosity (at 110° C.) (poise) |
|---|---|---|
| 53 | 21,000/9,000 | $3 \times 10^4$ |

Comparative Example A

Compared with the terpolymer obtained by the process of Example I, this polymer has a lower $M_w$ and a higher level of residual styrene and ethyl acrylate monomers. Lower $M_w$ results in lower mechanical strength of the polymer film. Higher levels of residual monomers require higher coating temperatures to vaporize the excess monomers, which can result in structural defects in the coated film.

Comparative Example B

A terpolymer of styrene, ethyl acrylate, and acrylic acid was prepared as follows. To a 10 gallon stainless steel reactor was added 10.2 kilograms of styrene (obtained from Dow Chemical Company, Sarnia, Ontario), 5.7 kilograms of ethyl acrylate (obtained from Rohm and Haas Company, Philadelphia), 216 grams of acrylic acid (obtained from Rohm and Haas Company, Philadelphia), 270 grams of t-amyl peroxy-2-ethyl hexanoate (Lupersol™ 575, obtained from Pennwalt Corporation, Buffalo, N.Y., a free radical initiator with a 10 hour half life at 75° C.), and 13 kilograms of toluene. The reactor was purged with nitrogen gas at 0.2 SCFH (Standard Cubic Foot per Hour) throughout the course of the reaction. Subsequently, polymerization was carried out at atmospheric pressure by heating the reaction mixture at a rate of 1° C. per minute to 93° C. and maintaining the mixture at that temperature for 8 hours. Subsequently, the reaction mixture was down at a rate of 1° C. per minute to 25° C. and discharged into metal drums. The resulting terpolymer contained styrene in an amount of 65 percent by weight, ethyl acrylate in an amount of 33 percent by weight, and acrylic acid in an amount of 2 percent by weight. Analysis of the terpolymer solution by gas chromatography for residual monomer contents indicated that about 7.4 percent of residual styrene and about 7.1 percent of residual ethyl acrylate based on 56 percent by weight solids remained in the solution. The terpolymer obtained exhibited the following characteristics:

| Glass Transition Temperature (° C.) | $M_w/M_n$ | Viscosity (at 110° C.) (poise) |
|---|---|---|
| 55 | 32,000/17,000 | $4 \times 10^4$ |

Comparative Example B

The high level of residual styrene and ethyl acrylate monomers in the copolymer solution is very undesirable. When this copolymer solution was coated to form a migration imaging member, gas chromatography analysis of the coated film indicated that the residual styrene in the film was over 800 ppm, a level which can pose a health hazard to the users.

Comparative Example C

Two commercially available terpolymers of styrene, ethyl acrylate, and acrylic acid were analyzed. RP-1215, available from Monsanto Company, Saint Louis, Mo., is a terpolymer comprising 74 percent by weight styrene, 24 percent by weight ethyl acrylate, and 2 percent by weight acrylic acid. The terpolymer is prepared by mixing together 75 parts by weight styrene, 23 parts by weight ethyl acrylate, 2 parts by weight acrylic acid, 1.6 parts by weight t-butyl perbenzoate, and 100 parts by weight toluene and refluxing the mixture for 22 hours. E-335, available from DeSoto, Inc., Des Plaines, Ill., is a terpolymer comprising 49 percent by weight styrene, 50 percent by weight ethyl acrylate, and 1 percent by weight acrylic acid. The terpolymer is prepared by mixing together 49 parts by weight styrene, 50 parts by weight ethyl acrylate, 1 part by weight acrylic acid, 60 parts by weight toluene, and 40 parts by weight xylene and refluxing the mixture for 22 hours. These terpolymers exhibited the following characteristics:

| | Glass Transition Temperature (° C.) | $M_w/M_n$ | Viscosity (at 110° C.) (poise) | Residual Monomer (percent) | |
|---|---|---|---|---|---|
| | | | | styrene | ethyl acrylate |
| RP1215 | 65 | 72,000/30,000 | $4 \times 10^5$ | 1.71 | 1.24 |
| E-335 | 36 | 54,000/21,000 | $3 \times 10^4$ | 0.05 | 0.54 |

Comparative Example C

The RP-1215 polymer exhibited a very high viscosity of $4 \times 10^5$ poises at 110° C. When used as a softenable material in a migration imaging member, a polymer with this high viscosity resists the migration of the photosensitive particulate marking material through the polymer matrix during the development step, resulting in an unacceptable electrostatic contrast voltage (difference between voltage in image areas and voltage in nonimage areas) for xeroprinting applications. The melt viscosity at 110° C. generally must be below $8 \times 10^4$ poises to be acceptable for xeroprinting applications wherein the xeromaster is prepared by a process using heat development. Although the E-335 copolymer exhibited acceptable viscosity, the glass transition temperature of 36° C. was unacceptably low. A minimum of 45° C. is generally required to prevent blocking of the film during coating or storage.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for preparing copolymers which comprises, in the order stated: (1) adding monomers containing unsaturated carbon-to-carbon bonds, two polymerization initiators, namely a first polymerization initiator with a 10 hour half-life temperature of from about 50° C. to about 95° C. and a second polymerization initiator with a 10 hour half-life temperature of from about 85° C. to about 130° C., and a solvent to a reaction vessel; (2) subsequent to step 1, purging the resulting solution with an inert gas; (3) subsequent to step 2, sealing the reaction vessel and pressurizing it by addition of an inert gas to a pressure of from about 20 to about 600 kiloposcals above ambient atmospheric pressure: (4) subsequent to step 3, maintaining the temperature within the pressurized reaction vessel at a substantially constant temperature within the range of from about 50 to about 100° C. for a period of from about 60 to about 300 minutes; (5) subsequent to step 4, maintaining the temperature within the pressurized reaction vessel at a substantially constant temperature within the range of from about 80 to about 115° C. for a period of from about 30 to about 300 minutes, wherein the temperature in step 5 is higher than the temperature in step 4: and (6) subsequent to step 5, maintaining the temperature within the pressurized reaction vessel at a substantially constant temperature within the range of from about 115 to about 160° C. for a period of from about 30 to about 180 minutes, wherein the temperature in step 6 is higher than the temperature in step 5, wherein the resulting copolymer is substantially free of gel formation.

2. A process according to claim 1 wherein the monomers are selected from the group consisting of vinylidene aromatic compounds, ethylenically unsaturated acid esters, and ethylenically unsaturated compounds containing at least one acid group.

3. A process according to claim 1 wherein the monomers are selected from the group consisting of styrene, styrene derivatives, alkyl acrylates, alkyl alkylacrylates, vinyl toluene monomers, olefins, diolefins, organic acids having carbon to carbon unsaturation, derivatives of organic acids having carbon to carbon unsaturation, and mixtures thereof.

4. A process according to claim 1 wherein the monomers are styrene, ethyl acrylate, and acrylic acid.

5. A process according to claim 4 wherein the styrene monomers are present in an amount of from about 30 to about 90 mole percent, the ethyl acrylate monomers are present in an amount of from about 10 to about 70 mole percent, and the acrylic acid monomers are present in an amount of from 0 to about 5 mole percent.

6. A process according to claim 4 wherein the styrene monomers are present in an amount of from about 40 to about 70 mole percent, the ethyl acrylate monomers are present in an amount of from about 29 to about 57 mole percent, and the acrylic acid monomers are present in an amount of from about 1 to about 3 mole percent.

7. A process according to claim 1 wherein the first polymerization initiator is selected from the group consisting of t-amyl peroxy pivalate, t-butyl peroxy-isobutyrate, t-amyl peroxy-2-ethyl-hexanoate, t-butyl peroxy-pivalate, t-butyl peroxy-maleic acid, t-butyl peroxy-2-ethyl hexanoate, 2,2'-azobis(isobutyronitrile, 2,2'-azobis(2-methyl butyronitrile), and benzoyl peroxide, and the second polymerization initiator is selected from the group consisting of t-butyl(2-ethyhexyl)-monoperoxy carbonate, t-amyl (2-ethyhexyl)-monoperoxy carbonate, ethyl 3,3-di(t-amyl peroxy)-butyrate, 2,2-di(t-amyl peroxy)-propane, 1,1-di(t-amyl peroxy)-cyclohexane, t-amyl peroxy-acetate, t-amyl peroxy-benzoate, di-t-butyl diperoxy-phthalate, and di-t-butyl diperoxy-azelate.

8. A process according to claim 1 wherein the first polymerization initiator is present in an amount of from about 0.2 to about 3.5 percent by weight of the monomers and the second polymerization initiator is present in an amount of from about 0.5 to about 5 percent by weight of the monomers.

9. A process according to claim 1 wherein the solvent is selected from the group consisting of toluene, dimethyl formamide, ethyl acetate, cyclohexane, carbon tetrachloride, n-heptane, n-hexane, methyl ethyl ketone, xylene, tetrahydrofuran, and mixtures thereof.

10. A process according to claim 1 wherein the solvent is present in an amount of from about 25 to about 90 percent by weight of the total solution.

11. A process according to claim 1 wherein the temperature in step (4) is from about 70 to about 90° C.

12. A process according to claim 1 wherein the temperature in step (4) is maintained for a period of from about 120 to about 240 minutes.

13. A process according to claim 1 wherein the temperature in step (5) is from about 100 to about 110° C.

14. A process according to claim 1 wherein the temperature in step (5) is maintained for a period of from about 90 to about 240 minutes.

15. A process according to claim 1 wherein the temperature in step (6) is from about 120 to about 140° C.

16. A process according to claim 1 wherein the temperature in step (6) is maintained for a period of from about 30 to about 120 minutes.

17. A process according to claim 1 wherein the pressure in step 3 is maintained at from about 50 to about 400 kilopascals above ambient atmospheric pressure.

18. A process according to claim 1 wherein the residual concentration subsequent to completion of the process of each monomer originally present in the reaction mixture is less than about 0.5 percent by weight of total monomer charge.

19. A process according to claim 1 wherein the resulting copolymers exhibit a polydispersity ($M_w/M_n$) of about 2 or greater.

20. A process according to claim 1 wherein the resulting copolymers exhibit a polydispersity ($M_w/M_n$) of about 3 or greater.

21. A process according to claim 1 wherein the resulting copolymers have a molecular weight ($M_w$) of about 20,000 or greater.

22. A process according to claim 1 wherein the 10 hour half-life temperature of the first polymerization initiator is from about 65° C. to about 85° C. and the 10 hour half-life temperature of the second polymerization initiator is from about 90° C. to about 105° C.

* * * * *